United States Patent
Aston (10) Patent No.: US 10,400,494 B2
(45) Date of Patent: Sep. 3, 2019

(54) DOOR CLOSER

(71) Applicant: Bard 1 LTD, Cardiff (GB)

(72) Inventor: Richard Aston, Alcester (GB)

(73) Assignee: Bard I, LTD (GB)

( * ) Notice: Subject to any disclaimer, the term of this patent is extended or adjusted under 35 U.S.C. 154(b) by 21 days.

(21) Appl. No.: 15/748,142

(22) PCT Filed: Jul. 28, 2016

(86) PCT No.: PCT/GB2016/052325
§ 371 (c)(1),
(2) Date: Jan. 26, 2018

(87) PCT Pub. No.: WO2017/017464
PCT Pub. Date: Feb. 2, 2017

(65) Prior Publication Data
US 2018/0252014 A1     Sep. 6, 2018

(30) Foreign Application Priority Data

Jul. 28, 2015    (GB) .................................. 1513274.9

(51) Int. Cl.
*E05F 3/10*         (2006.01)
*E05F 3/12*         (2006.01)
(Continued)

(52) U.S. Cl.
CPC .................. *E05F 3/10* (2013.01); *E05F 3/12* (2013.01); *E05F 3/223* (2013.01);
(Continued)

(58) Field of Classification Search
CPC .... E05F 3/10; E05F 3/12; E05F 3/223; E05Y 2201/246; E05Y 2201/41; E05Y 2201/458;
(Continued)

(56) References Cited

U.S. PATENT DOCUMENTS 3,771,195 A     11/1973   Tansley
4,263,694 A *    4/1981   Jentsch .................... A62C 2/12
                                                           16/48.5
(Continued)

FOREIGN PATENT DOCUMENTS

DE      102007042270 A1 *   9/2007
GB           2254653           10/1992
(Continued)

OTHER PUBLICATIONS

International Search Report, dated Jul. 28, 2016, 5 pages.

*Primary Examiner* — Victor D Batson
*Assistant Examiner* — Matthew J Sullivan
(74) *Attorney, Agent, or Firm* — Waller Lansden Dortch & Davis, LLP; Matthew C. Cox (57) ABSTRACT

A door closer including: a body defining a chamber therein; a piston slidably supported within the chamber, and dividing the chamber into first and second cavities either side of the piston, which in use receive liquid; a biasing device for biasing the piston towards the first cavity; a passageway connecting the first cavity to the second cavity for permitting the flow of fluid therebetween; a blocking member for controlling the flow of liquid through the passageway between the cavities; a moveable member moveable between first and second positions, wherein when the moveable member is in its first position the moveable member causes or permits the blocking member to assume a blocking position, thus preventing or at least inhibiting the flow of liquid from the first to the second cavity, and wherein when the moveable member is in its second position the moveable member causes or permits the blocking member to assume a non-blocking position, thus permitting the flow of liquid from the first to the second cavity; and a permanent magnet positioned adjacent or close to the moveable member for holding the moveable member in its first position; wherein (Continued)

the door closer includes a pole switching device that can produce a magnetic field that is in opposition to the magnetic field of the permanent magnet to effectively cancel out or overcome the magnetic field of the permanent magnet and produce a net magnetic field that is either zero or in the opposite direction to the magnetic field of the permanent magnet so as to effect movement of the moveable member between its first and second positions.

20 Claims, 10 Drawing Sheets

(51) Int. Cl.
  *E05F 3/22* (2006.01)
  *F16K 31/08* (2006.01)
  *F16K 31/06* (2006.01)
(52) U.S. Cl.
  CPC ...... *F16K 31/0655* (2013.01); *F16K 31/0675* (2013.01); *F16K 31/082* (2013.01); *E05Y 2201/246* (2013.01); *E05Y 2201/41* (2013.01); *E05Y 2201/458* (2013.01); *E05Y 2201/46* (2013.01); *E05Y 2201/462* (2013.01); *E05Y 2400/32* (2013.01); *E05Y 2400/612* (2013.01); *E05Y 2800/25* (2013.01); *E05Y 2800/252* (2013.01)
(58) Field of Classification Search
  CPC ........... E05Y 2201/46; E05Y 2201/462; E05Y 2400/32; E05Y 2400/612; E05Y 2800/25; E05Y 2800/252
  See application file for complete search history.

(56) References Cited

U.S. PATENT DOCUMENTS

| | | | | | |
|---|---|---|---|---|---|
| 4,506,407 | A | * | 3/1985 | Downey | E05F 3/222 |
| | | | | | 16/320 |
| 4,590,639 | A | * | 5/1986 | Fritsche | E05F 3/10 |
| | | | | | 116/204 |
| 4,637,427 | A | * | 1/1987 | Nolan | F16K 31/082 |
| | | | | | 137/460 |
| 4,663,800 | A | * | 5/1987 | Mettenleiter | E05F 3/221 |
| | | | | | 16/51 |
| 6,154,924 | A | * | 12/2000 | Woo | E05F 3/14 |
| | | | | | 16/51 |
| 6,630,877 | B2 | * | 10/2003 | Manthey | E05C 19/168 |
| | | | | | 24/303 |
| 7,275,631 | B2 | * | 10/2007 | Hsieh | E06B 9/82 |
| | | | | | 160/9 |
| 2003/0213092 | A1 | | 11/2003 | Fischbach | |
| 2012/0272475 | A1 | * | 11/2012 | Bienek | E05F 3/104 |
| | | | | | 16/51 |
| 2013/0000074 | A1 | | 1/2013 | Bienek | |
| 2013/0020515 | A1 | | 1/2013 | Bienek et al. | |

FOREIGN PATENT DOCUMENTS

| | | |
|---|---|---|
| GB | 2323125 | 9/1998 |
| GB | 2323409 | 9/1998 |
| WO | 2008134412 | 11/2008 |
| WO | 2010128314 | 11/2010 |

* cited by examiner

DOOR CLOSER

CROSS-REFERENCES TO RELATED APPLICATIONS

This application is a National Stage Application of PCT International Application No. PCT/GB2016/052325, International Filing Date, Jul. 28, 2016, claiming priority to Great Britain Application No. GB1513274.9, filed Jul. 28, 2015, each of which are herein incorporated by reference in their entireties.

The invention relates to a door closer for controlling the movement of a door to which it is fitted.

Door closers which can hold doors open are well known. They are used for example, in hotel corridors where fire doors may be held open during the day for the convenience of guests, but may be released automatically if smoke is detected or a fire alarm activated. An example of such a door closer can be seen in GB2323125. However, one issue with such prior art door closers is that they require a constant source of power in order to hold a door in its open position. Not only is this costly in terms of the electricity being used, it also means fitting such door closers is more time-consuming and thus expensive as additional wiring is required. In the case of retrofitting such door closers, this can present issues with change to wall coverings and the like, which increases cost.

It is an object of the present invention to provide a door closer which addresses this problem.

BRIEF SUMMARY

The present invention provides the advantage that is easy to retrofit and cheaper to run than the door closers in the prior art.

According to a first aspect of the invention, we provide a door closer including: a body defining a chamber therein; a piston slidably supported within the chamber, and dividing the chamber into first and second cavities either side of the piston, which in use receive liquid; a biasing device for biasing the piston towards the first cavity; a passageway connecting the first cavity to the second cavity for permitting the flow of fluid therebetween; a blocking member for controlling the flow of liquid through the passageway between the cavities; a moveable member moveable between first and second positions, wherein when the moveable member is in its first position the moveable member causes or permits the blocking member to assume a blocking position, thus preventing or at least inhibiting the flow of liquid from the first to the second cavity, and wherein when the moveable member is in its second position the moveable member causes or permits the blocking member to assume a non-blocking position, thus permitting the flow of liquid from the first to the second cavity; and a permanent magnet positioned adjacent or close to the moveable member for holding the moveable member in its first position; wherein the door closer includes a pole switching device that can produce a magnetic field that is in opposition to the magnetic field of the permanent magnet to effectively cancel out or overcome the magnetic field of the permanent magnet and produce a net magnetic field that is either zero or in the opposite direction to the magnetic field of the permanent magnet so as to effect movement of the moveable member between its first and second positions.

According to a second aspect of the invention, we provide a door closer including: a body defining a chamber therein; a piston slidably supported within the chamber, and dividing the chamber into first and second cavities either side of the piston, which in use receive liquid; a biasing device for biasing the piston towards the first cavity; a passageway connecting the first cavity to the second cavity for permitting the flow of fluid therebetween; a blocking member for controlling the flow of liquid through the passageway between the cavities; a moveable member moveable between first and second positions, wherein when the moveable member is in its first position the moveable member causes or permits the blocking member to assume a blocking position, thus preventing or at least inhibiting the flow of liquid from the first to the second cavity, and wherein when the moveable member is in its second position the moveable member causes or permits the blocking member to assume a non-blocking position, thus permitting the flow of liquid from the first to the second cavity; and a magnet positioned adjacent or close to the moveable member; wherein the door closer includes a pole switching device for removing or switching the poles of the magnet so as to effect movement of the moveable member between its first and second positions.

Further features of the first and second aspects of the invention are set out in the claims appended hereto.

BRIEF DESCRIPTION OF THE DRAWINGS

Embodiments of the invention will now be described, by way of example only, with reference to the accompanying drawings in which:

FIG. 9 shows another alternative embodiment of the door closer using a rotational blocking member, showing the oil flow path during door opening.

DETAILED DESCRIPTION

Referring to FIGS. 1 to 4 a door closer 10 is shown including a body 11 with a cylindrical chamber 12 therein. The chamber 12 is closed at one end by a plug 13 and at the other end by an end cap 14. The end cap 14 is sealed to the body 11 by O rings 15a, 15b.

A piston 16 is slidably supported within the chamber 12 which divides the chamber 12 into first and second cavities 21, 22. The piston 16 is biased towards the end of the chamber 12 closed by the plug 13 by a biasing device 17, in this case a spring, positioned within the second cavity 22. The spring could also be placed in the first cavity 21, or indeed in any position that causes the piston 16 to be biased towards the end of the chamber 12, without departing from the scope of the present invention.

The piston 16 is provided with rack teeth (not shown) along wall 19. Engaged with the teeth are complimentary teeth (not shown) of a pinion 20, which extends out of the body 11 in the normal manner for connection to an arm, or a system of levers, or even a chain (as seen in use on a concealed door closer). In use, the arm, system of levers, or chain, is attached or is held against either a door or its frame so that opening and closing movement of the door is accompanied by axial movement of the piston 16 within the cylindrical chamber 12. The movement of the piston 16 alters the respective volumes of the first and second cavities 21, 22, although their total volume remains the same. It should be appreciated, however, that the present invention is suited to many other types of door closer, e.g. cam action door closers.

A passageway 25 connects the first cavity 21 to the second cavity 22 to permit the flow of fluid therebetween. In this embodiment it can be seen that the passageway 25 is in fluid connection with a piston cavity 18 through a bore 26, provided between the main passageway 25 and piston cavity 18. Two further bores 27, 28 are provided between the main passageway 25 and either the piston cavity 18 or the second cavity 22, dependant on the position of the piston 16. It should be appreciated though that this is not essential to the working of the invention. The invention only requires that there be a passageway connecting the first cavity 21 to the second cavity 22, for permitting the flow of fluid therebetween. In the present example, however, liquid flow passes through the piston cavity 18 en route to the first cavity 21.

The cylindrical chamber 12 is filled with hydraulic liquid, such as oil, which occupies the first cavity 21, second cavity 22, and piston cavity 18.

A passageway 23 is provided between the first cavity 21 and the piston cavity 18. The passageway 23 contains a check valve (i.e. one way valve) 24.

A connecting passageway 29 is provided between the main passageway 25 and passageways in the end caps 14 within the body, as will now be described.

The connecting passageway 29 communicates with a bore 30 containing a filter 31, which prevents particles entering the passageways in the end cap 14. The bore 30 provides a further passageway which communicates with a valve chamber 32. The chamber 32 contains a one-way valve 33 including a valve member 33a in the form of a rubber ball, and a biasing device, in this instance a spring 33b. The valve 33 permits the flow of liquid from the second cavity 22 to the main passageway 25, and therefore from the second cavity 22 to the first cavity 21 (via the intermediary of the piston cavity 18, although this is not an essential route), but does not permit the reverse flow from the main passageway 25 to the second chamber 22. The valve chamber 32 communicates with a bore 34 leading to a second valve chamber 35.

The second valve chamber 35 contains a blocking member 36, for controlling the flow of liquid through the passageway 25 between the two cavities, in the form of a ball bearing. The blocking member 36 forms part of a magnetic valve 37, which also includes a plunger 38, a permanent magnet 56, a moveable member 39, and a pole switching device 40.

The moveable member 39 is moveable, in this example linearly, between first and second positions. In a first position the moveable member 39 causes or permits the blocking member 36 to assume a blocking position, thus preventing the flow of liquid from the second cavity 22 to the first cavity 21. In its second position the moveable member 39 causes or permits the blocking member 36 to assume a non-blocking position, thus permitting the flow of liquid from the first cavity to the second cavity. In some embodiments, the moveable member 39 is a magnetically susceptible moveable member, otherwise known as a magnetically susceptible member.

The term "magnetically susceptible moveable member" is intended to mean any moveable member that is capable of being influenced by a magnetic field. Specifically, it is intended to mean any moveable member that can be moved by a magnetic field, such as, for example, the magnetic field produced by magnet 56. It has been envisaged that the magnetically susceptible moveable member could be provided as a further magnet, though this is not essential to the workings of the invention. All that is required is a moveable member that will move between first and second positions. Examples of materials a magnetically susceptible member could be made from include, but are not limited to, a ferrous material such as iron or steel, cobalt, nickel, boron, or even a rare earth magnet such as neodymium. A magnetically susceptible member could also be made of an alloy of these. Another possibility is that the magnetically susceptible member could be a ceramic magnet.

The pole switching device 40 effectively acts to "remove" or "switch" the effect of the magnetic field $M_m$ (not shown) of the magnet 56 by producing a magnetic field $M_p$ (not shown) that is in opposition to the magnetic field $M_m$ of the magnet 56 so as to effectively cancel out or overcome the magnetic field $M_m$ of the magnet 56. This produces a resultant, or net, magnetic field that is either zero or in the opposite direction to the magnetic field $M_m$ of the magnet 56. In one specific example, the pole switching device 40 is an electromagnetic device, e.g. a solenoid. The pole switching device 40 is supplied with electricity from power source 50. The power source 50 in this embodiment is a 4.5V battery power source contained in the body of the door closer, but it should be appreciated that alternative sources of power, e.g. a different voltage battery power source or mains electricity, could be used without departing from the scope of the present invention. The pole switching device 40 is positioned near to and/or around the magnet 56. It should be appreciated, however, that the pole switching device 40 does not need to be positioned around magnet 56. The pole switching device 40 only needs to be able to cancel out or overcome the magnetic field of the magnet 56. In one particular embodiment the magnet 56 is preferably annular or substantially annular and surrounds the moveable member 39, as shown in FIGS. 1 to 4. In one embodiment the permanent magnet includes an aperture or passage through which the moveable member 39 passes. Preferably, the pole switching device 40 includes an aperture or passage through which the moveable member 39 can pass. Preferably the aperture or passage in the pole switching device 40 and the aperture or passage in the permanent magnet 56 communicate with each other and are preferably coaxial, thus permitting easily movement of the moveable member 39 between its first and second positions.

Where the magnetic field $M_p$ of the pole switching device 40 overcomes the magnetic field $M_m$ of the magnet 56, there will be a net magnetic force acting on the moveable member 39 which moves it away from the piston and to its second, unblocking, position. In other words, the magnetic field $M_p$ of the pole switching device 40 overcomes the magnetic field $M_m$ of the magnet 56 that the moveable member 39 experiences, i.e. the field local to the moveable member 39. This may provide the advantage of the pole switching device 40 requiring less energy as the magnetic field that needs to be overcome will only be a portion of the magnetic field produced by the magnet 56.

In embodiments for which the magnetic field $M_p$ of the pole switching device 40 only cancels out the magnetic field $M_m$ of the magnet 56, there will be no force acting on the moveable member 39. Thus, the moveable member 39 is permitted to move away from engagement with the blocking member 36 due to the pressure exerted on the blocking member 36 by the combination of the spring 17, the piston 16 and the oil in the first cavity 21.

Figure 4:
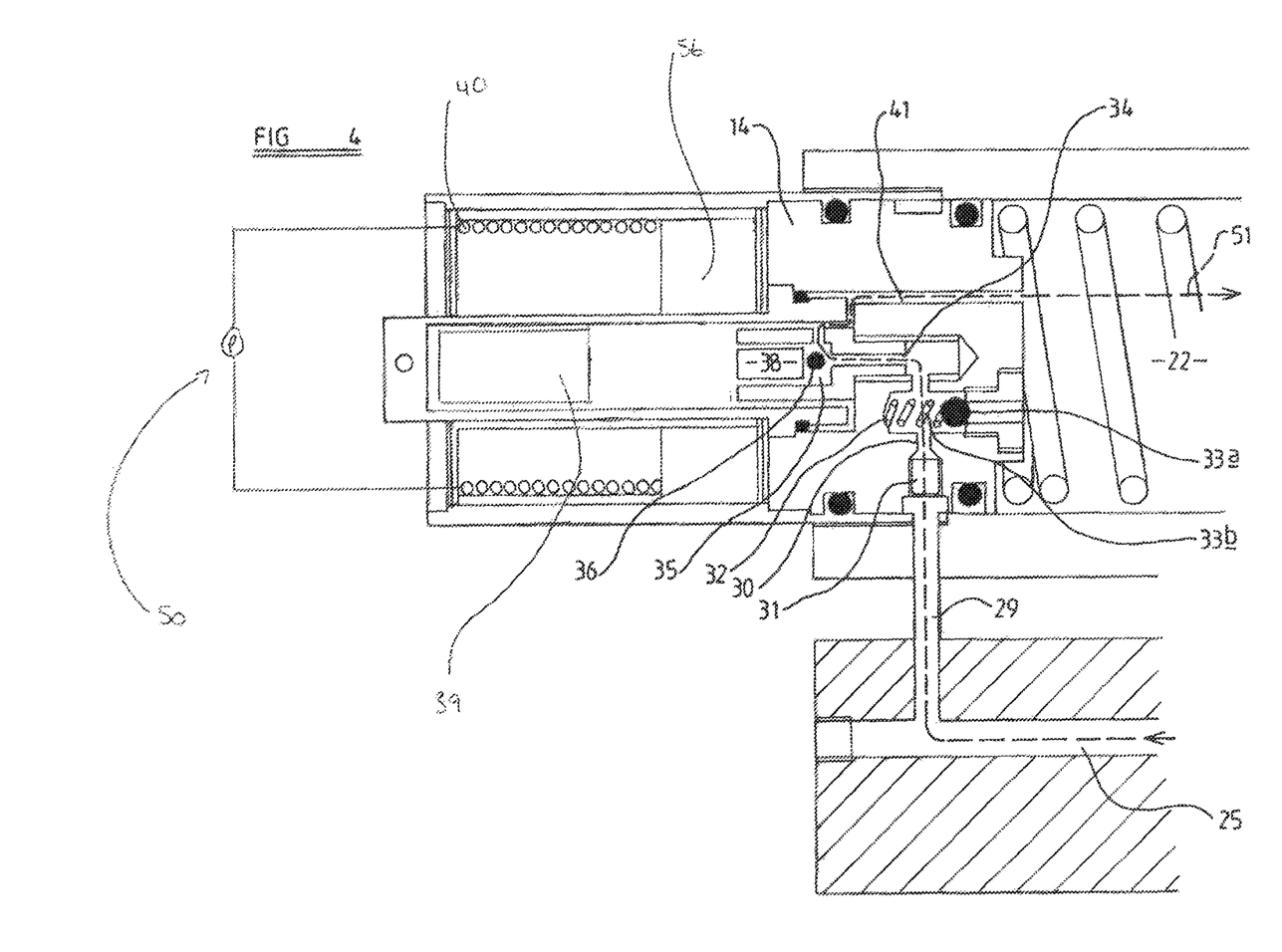
FIG. 4 shows the same area as FIG. 3, with the oil flow path for door closing indicated.

A sensor (not shown) is provided on the door closer 10 which detects if a fire alarm is sounding. If a fire alarm is detected, or if an override switch is activated, and the door needs to be closed, a controller in the door closer receives a signal from the sensor and then operates the power source 50 to provide an electrical pulse to the pole switching device 40 which causes the opposing magnetic field $M_p$ to the magnet 56 to be produced. The magnetic field $M_p$ is produced for a sufficient amount of time to move the moveable member 39 towards its second position sufficiently away from the magnet 56 (as shown in FIG. 4) to its second position so that the magnetic force of the magnet 56 no longer acts on the moveable member 39. This permits the blocking member 36 to assume a non-blocking position so that oil from the first cavity 21 can move along the passageway 25 to the second cavity 22, which in turn permits the door to close.

When it is required for the door to be held open again (or indeed after a period of time has passed since the alarm was sensed), a further electrical pulse is provided by the power source 50 in the opposite direction through the pole switching device 40 to previously. This causes the pole switching device 40 to produce a magnetic field $-M_p$ which is synergistic with the magnetic field $M_m$ produced by the magnet 56. The magnetic field $-M_p$ is produced for a sufficient amount of time to move the moveable member 39 at least partly towards its first position so that the magnetic force of the magnet 56 once again acts on the moveable member and the blocking member is forced to assume a blocking position.

There are a number of envisaged ways that the door closer 10 may determine when it is appropriate for the further electrical pulse to be provided. One example way in which the door closer 10 may determine when to provide the further electrical pulse is by using a time lag from when the first pulse is produced. For instance, it may be known that it takes roughly three seconds for a door to close (or partially close to a particular angular position) once the oil, piston 16 and spring 17 are permitted to move, i.e. once the pulse has been provided. The door closer 10 may, therefore, provide the further pulse after three seconds to move the moveable member back to its first position and ensure that the door will be held open when it is opened again. Of course, it should be appreciated that the invention is not limited to a door that takes three seconds to close. The invention can be used on any door that takes any period of time to close.

In one embodiment, a user may be able to set when the further electrical pulse is provided if the door it is being used on closes more quickly or slowly than three seconds. In this embodiment the three second time lag may be provided as a default setting if a user does not choose their own time lag setting.

In another embodiment, the door closer 10 may be provided with a door position sensor (not shown). The sensor will let the door closer 10 determine whether the door is closed. If the door is closed then the further electrical pulse needs to be provided so the door closer 10 is primed and ready to hold the door open when the door is next opened by a user.

In envisaged embodiments not described above a biasing device, such as a spring, may be used to bias the moveable member 39 to either its first or second positions. This may be advantageous in either: reducing the energy needed for the pole switching device 40 to oppose the magnetic field of the magnet 56; or aiding the magnet 56 in returning the moveable member 39 back to its first position. Such a biasing device is not essential to the invention, however.

The valve chamber 35, the blocking member 36, the moveable member 39, and the magnet 56 can be positioned in either of the first or second cavities 21, 22, or even within the passageway 25 connecting the first cavity 21 to the second cavity 22 without departing from the scope of the present invention. All that is required is that the blocking member 36 is moveable between blocking and non-blocking positions.

In the current embodiment the blocking member 36, plunger 38 and the moveable member 39 are provided as separate components, but it is also envisaged that they could be connected directly or indirectly to each other, or even formed as a single component part) to help ensure they stay in the correct positional relationship.

It has also been envisaged that a plurality of permanent magnets could be provided, either with or without their own pole switching device(s), to work with the magnet 56. In this configuration the plurality of permanent magnets may be positioned in a preferably annular array around the moveable member 39 so to effect movement of the moveable member 39 between its first and second positions.

The valve chamber 35 communicates with a further bore 41 which in turn communicates with the second cavity 22. In the unlikely event that the door closer 10 fails, with the blocking member 36 in its first blocking position, and there is a need to close the door, this is still possible to close the door. If a user applies sufficient force to the door, the force of the moveable member 39 on the blocking member 36 can be overcome by the resulting pressure of the liquid acting on it from the second cavity side. This allows the door to be shut in case of a door closer 10 failure.

Figure 1:
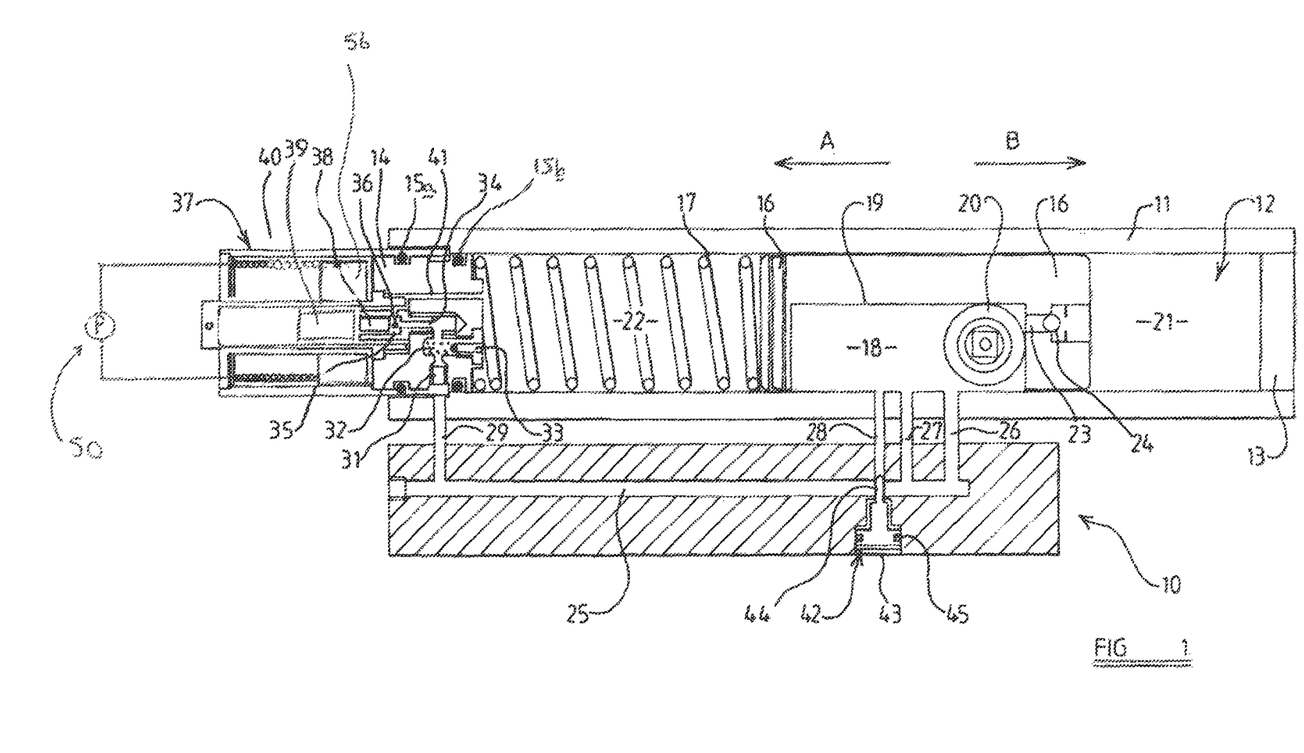
FIG. 1 illustrates a door closer according to the invention in cross section, with the closer being in door open position.

The door closer 10 further includes an adjuster screw 42 having a head 43 for engagement with a screwdriver or the like, and at the opposite end a plug portion 44. An O ring seal 45 is provided around the head 43. With the adjuster screw 42 positioned as shown in FIG. 1, the plug portion 44 is engaged in and hence closes off bore 28 from the main passageway 25. When the adjuster screw is screwed outwards the plug portion 44 disengages from and hence opens the bore 28. This adjustment allows for the use of the door closer with different arm configurations as will become clear later. As the bore 28 is significantly narrower than the main passageway 25, the plug portion 44 does not prevent flow of fluid along the main passageway 25 when positioned as shown in FIG. 1.

Operation of the door closer 10 will now be described.

Figure 2:
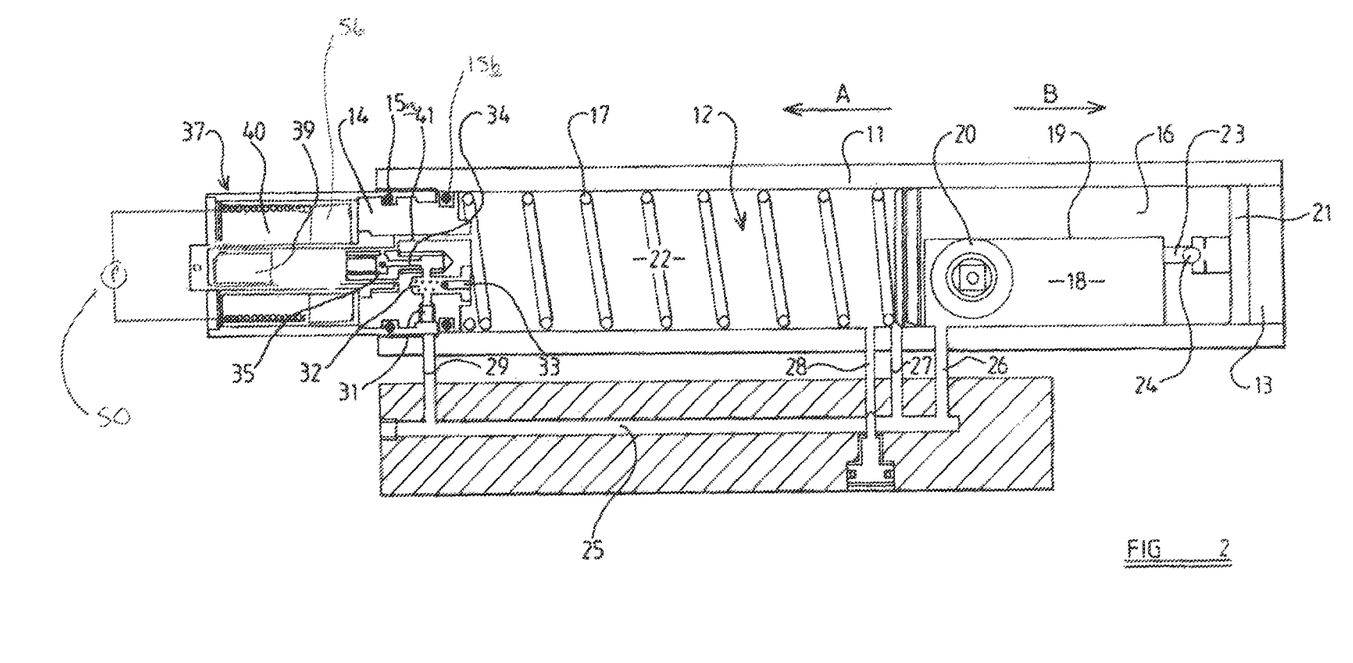
FIG. 2 illustrates the door closer of FIG. 1 in door closed position.
Figure 3:
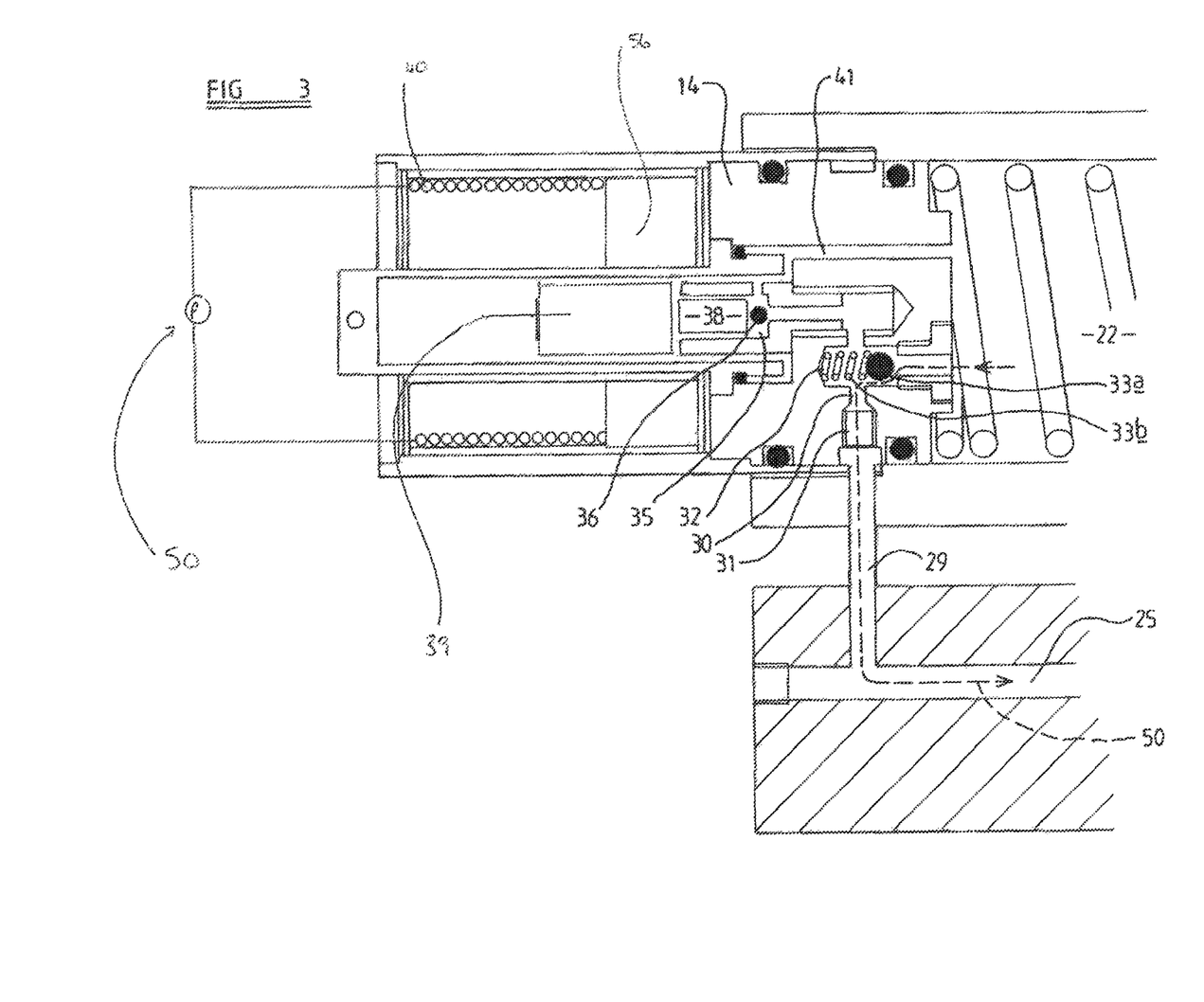
FIG. 3 illustrates part of the door closer of FIG. 1 in greater detail showing an oil flow path during door opening.

When the door is closed, the door closer 10 is positioned as shown in FIG. 2. The piston 16 is at one end of its travel, towards the plug 13, with the first cavity 21 at or near its minimum volume and the second cavity 22 at or near its maximum volume.

As the door is opened, with the moveable member in its first position, the pinion 20 rotates and drives the piston 16 in the direction of arrow A against the bias of the spring 17. The movement of the piston 16 reduces the volume of the second cavity 22 and forces oil out of the second cavity 22. Initially the flow is via bores 27 or 27 and 28, the main passage 25 and bore 26. But as the piston 16 moves axially along the chamber 12, in the direction of arrow A, the end 16a passes the bores 28 and subsequently 27 such that they are closed off from the second cavity 22. Bore 26 remains in communication with the piston cavity 18, however. The fluid then opens one-way valve 33, against the bias of spring 33b, passes through bore 30, and through the filter 31, into connecting passage 29, main passageway 25 and bore 26, 27 or 28 into the piston cavity 18. This flow path is illustrated by arrow 50 in FIG. 3. As piston cavity 18 is of fixed dimensions, oil also flows through the passageway 23 into the first cavity 21.

As the blocking member 36 is in its blocking position the flow of oil from the first cavity to the second cavity is prevented, and so the door is held in the open position against the bias of spring 17.

If the door closer 10 receives a signal that indicates that the door should be in a closed position, for example if a fire alarm is activated or an override switch is activated (e.g. a wifi signal sent to a receiver in or connected to the door closer), an electrical pulse is sent through pole switching device 40 sufficient to produce a magnetic field $M_p$ in opposition to the magnetic field $M_m$ of the magnet 56 to effectively cancel out or overcome the magnetic field $M_m$ of the magnet 56. This produces a net magnetic force which acts on the moveable member 39 and permits the moveable member 39, to move to its second position such that it allows the plunger 38 to no longer engage with the blocking member 36, which allows the blocking member 36 to move into a non-blocking position as shown in FIGS. 2 and 4. Oil can then flow from the second cavity to the first cavity so that the piston 16 can be moved under the bias of the spring 17 in the direction of arrow B. The movement decreases the volume of the first cavity 21, forcing oil out of that cavity. As the piston 16 moves in the direction of arrow B, oil from the first cavity 21 passes through the bore 23 into the piston cavity 18, via bores 26, 27, and 28 if open, into the main passageway 25, to the connecting passageway 29 through the filter 31 and bore 30, through valve chamber 32, into bore 34, through valve chamber 35 and finally through bore 41 to the second cavity 22. This flow path is illustrated by arrow 51 in FIGS. 4 and 6. As the piston 16 moves in direction B, the bore 28 is closed from the piston cavity 18, and subsequently also the bore 27 is closed, each of these bores then being opened to the second cavity 22 as the piston 16 continues to move.

Figure 5:
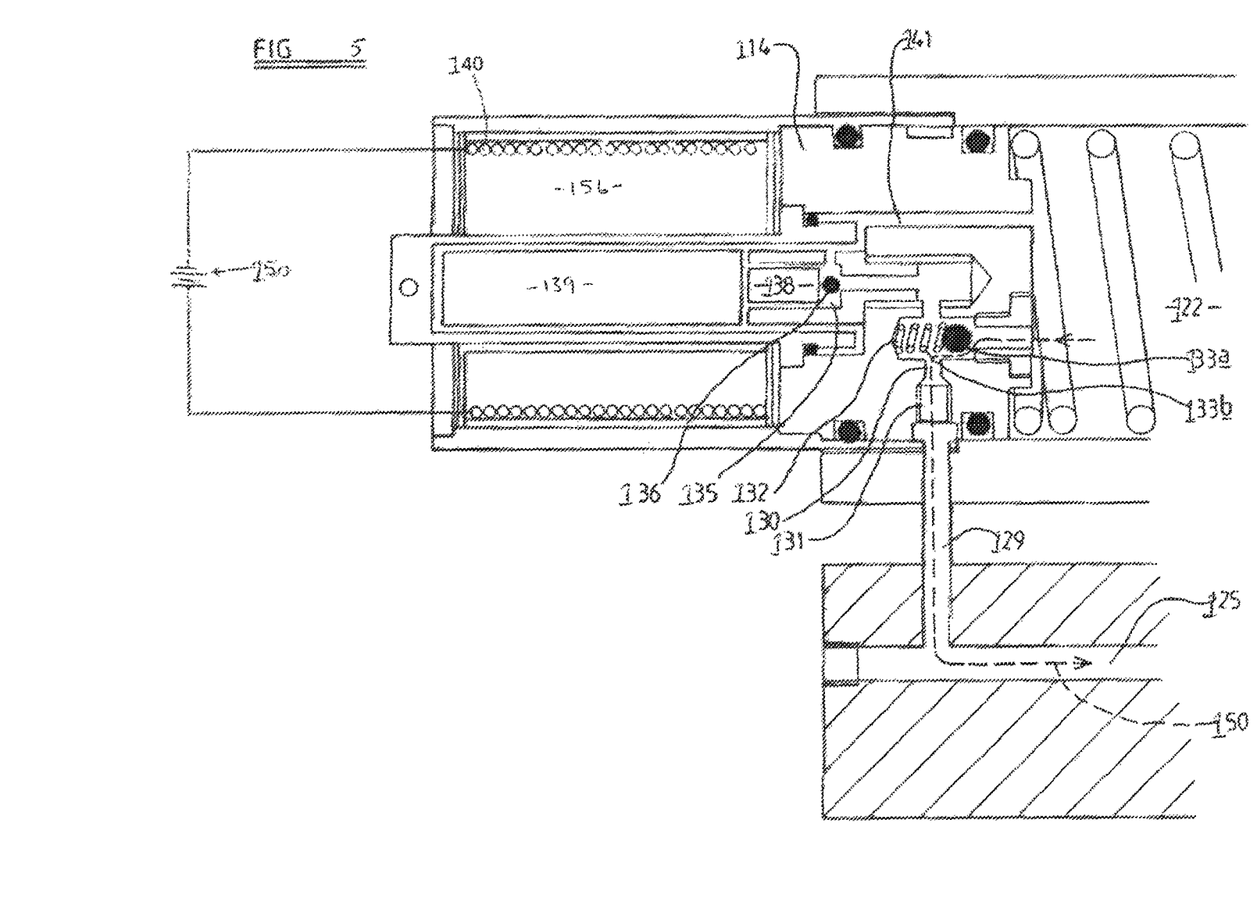
FIG. 5 shows an alternative embodiment of the door closer showing an oil flow path during door opening.
Figure 6:
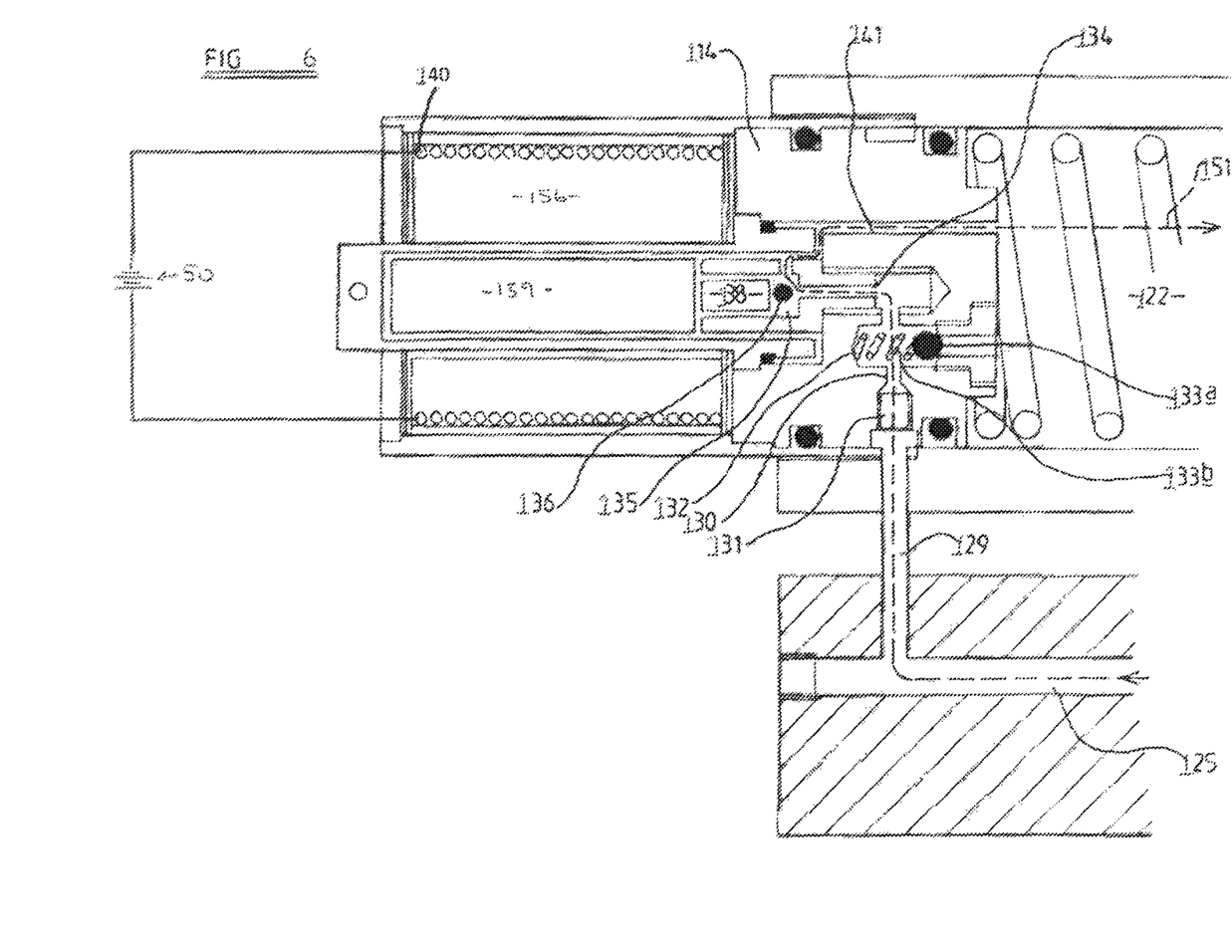
FIG. 6 shows the same area as FIG. 5, with the oil flow path for door closing indicated.

FIGS. 5 and 6 show an alternative embodiment. Features in common with the embodiment shown in FIGS. 1 to 4 have been given the same reference numeral but with the addition of 100.

The embodiment shown in FIGS. 5 and 6 uses the same principle to operate as the first embodiment described, but has a slightly different mode of operation. In this embodiment the moveable member 139 is not moved outside of the influence of the magnet 156. Whilst the electrical pulse is supplied to the pole switching device 140, the magnetic field $M_p'$ (not shown) overcomes the magnetic field $M_m'$ (not shown) of the magnet 156 and holds the moveable member 139 in its second position, thus permitting the blocking member 136 to assume a non-blocking position and the door to close. The electrical pulse is supplied for a sufficient period of time to permit the door to close (for instance 3 seconds). Once this time has passed, the electrical pulse is no longer supplied and the pole switching device 140 no longer produces the magnetic field $M_p'$. Then, because the moveable member 139 is still within the influence of the magnet 156, the magnetic field $M_m'$ causes the moveable member 139 to move towards and assume its first position, thus causing the blocking member 136 to assume a blocking position. The door is then ready to be held open the next time the door is opened. It should be appreciated that mechanisms for determining how long the pulse needs to be supplied to the pole switching device 240 are similar to the mechanisms described in the first embodiment to determine when the second, further, pulse needs to be provided.

Figure 7:
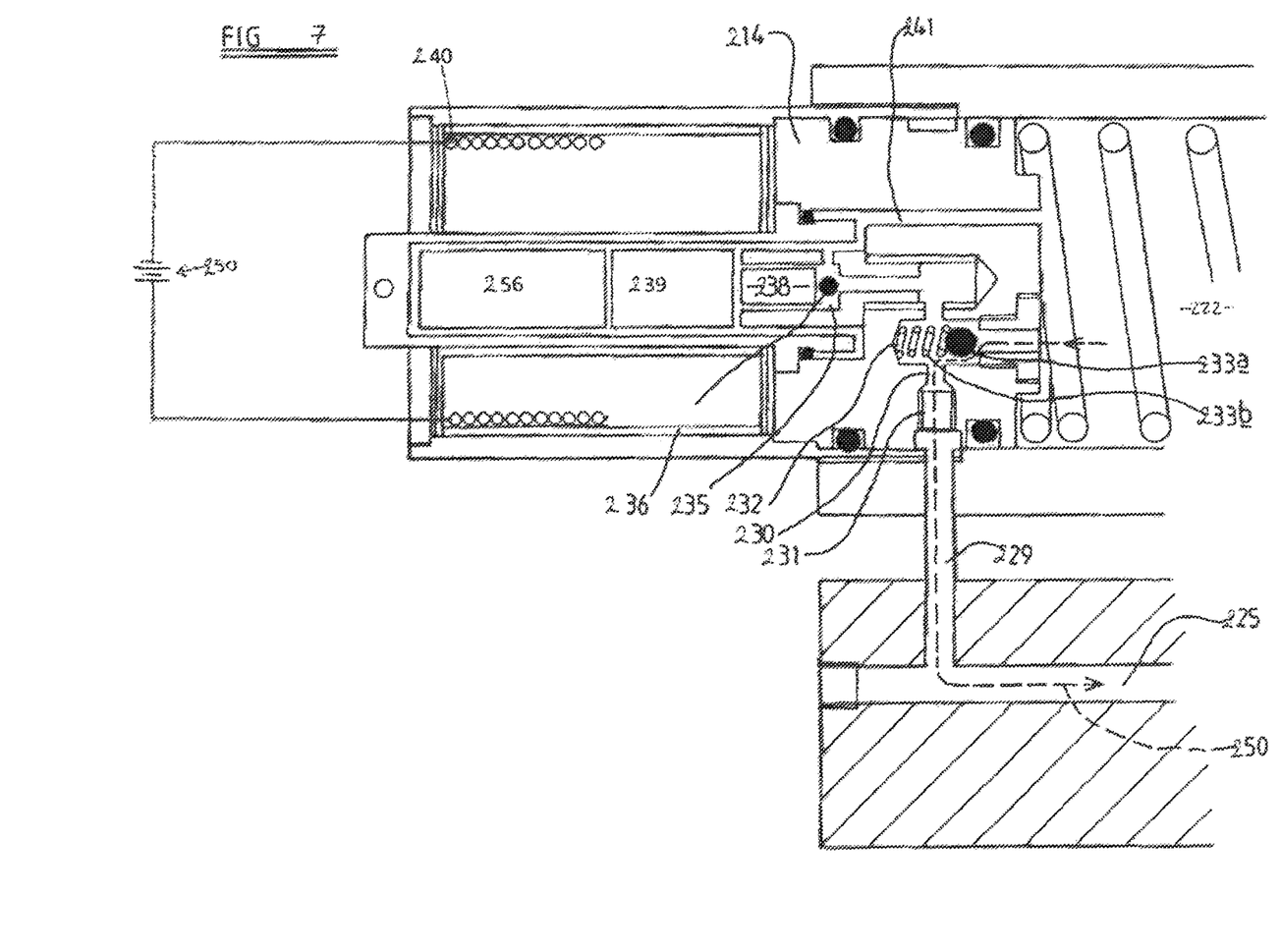
FIG. 7 shows another alternative embodiment of the door closer showing an oil flow path during door opening.
Figure 8:
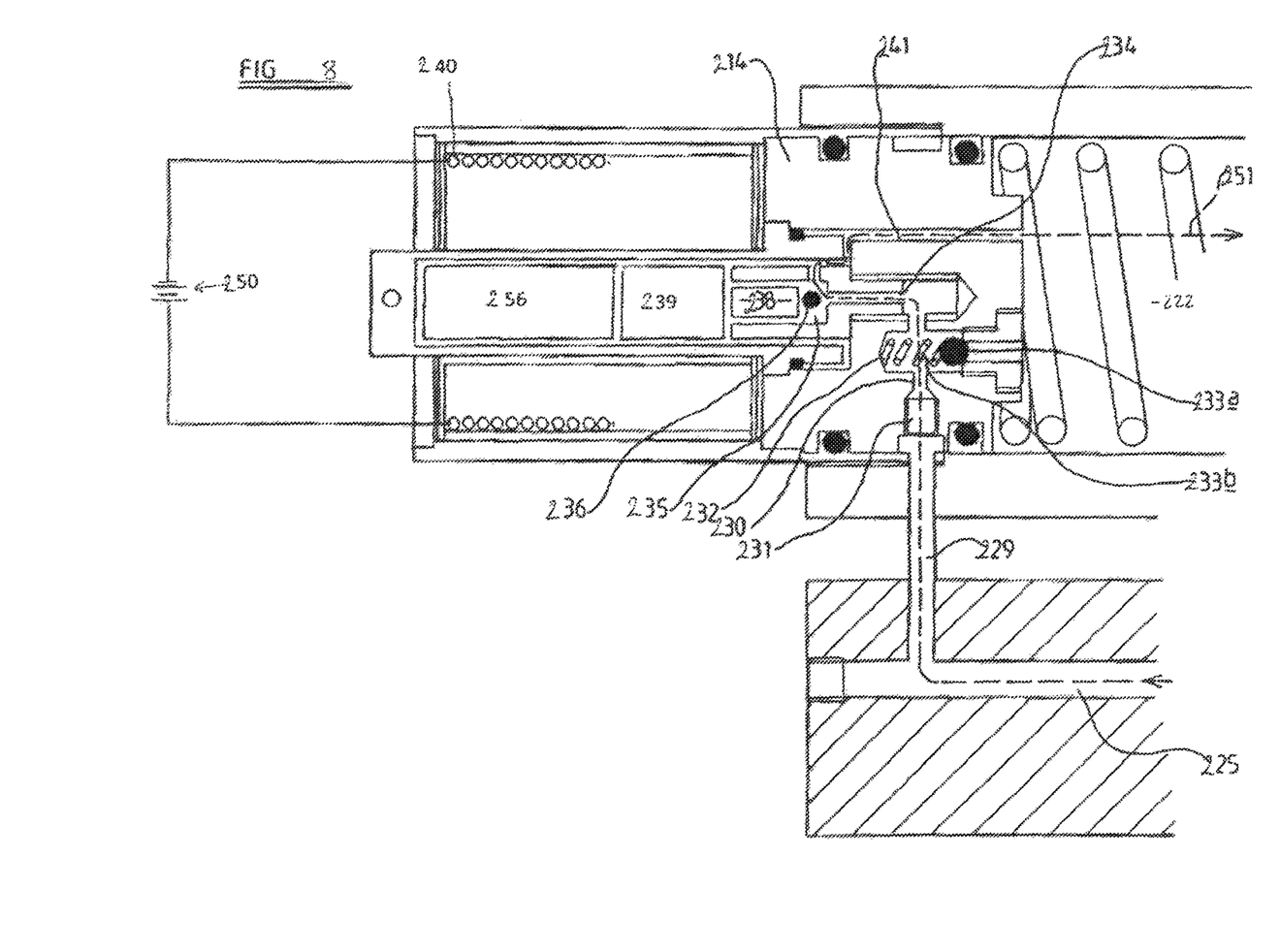
FIG. 8 shows the same area as FIG. 7, with the oil flow path for door closing indicated.

A further alternative embodiment is shown in FIGS. 7 and 8. Features in common with the embodiment shown in FIGS. 1 to 4 have been given the same reference numeral but with the addition of 200.

In this embodiment the moveable member 239 is provided as a further magnet to magnet 256. The moveable member 239 is positioned so as to be repelled by the magnet 256 so that when no power is supplied to the door closer 10 the moveable member 239 is forced to be in its first position and the blocking member 236, therefore, assumes a blocking position. In this embodiment the magnet 256 and the moveable member 239 may be in a substantially side by side configuration. When an electrical pulse is supplied to the pole switching device 240 to overcome the magnetic field of the magnet 256 the moveable member 239 is permitted to move to its second position and the blocking member 236 can assume a non-blocking position, thus permitting the door to close. It should be appreciated that mechanisms for determining how long the pulse needs to be supplied to the pole switching device 240 are similar to the mechanisms described in the first embodiment to determine when the second, further, pulse needs to be provided.

It should be appreciated that the pole switching device 240 need not necessarily produce a magnetic field to overcome the magnetic field of the magnet 256 as described previously. The pole switching device 240 could be provided as a means of moving the magnet 256 such that its magnetic field is moved between a first position to enable blocking of oil flow and a second position which permits oil flow. In the first position the magnet 256 is positioned so as to repel the moveable member 239, thus forcing the blocking member 236 to assume a blocking position. In the second position the magnet 256 is positioned so as to attract the moveable member 239, thus permitting the blocking member 236 to assume a non-blocking position.

Figure 10:
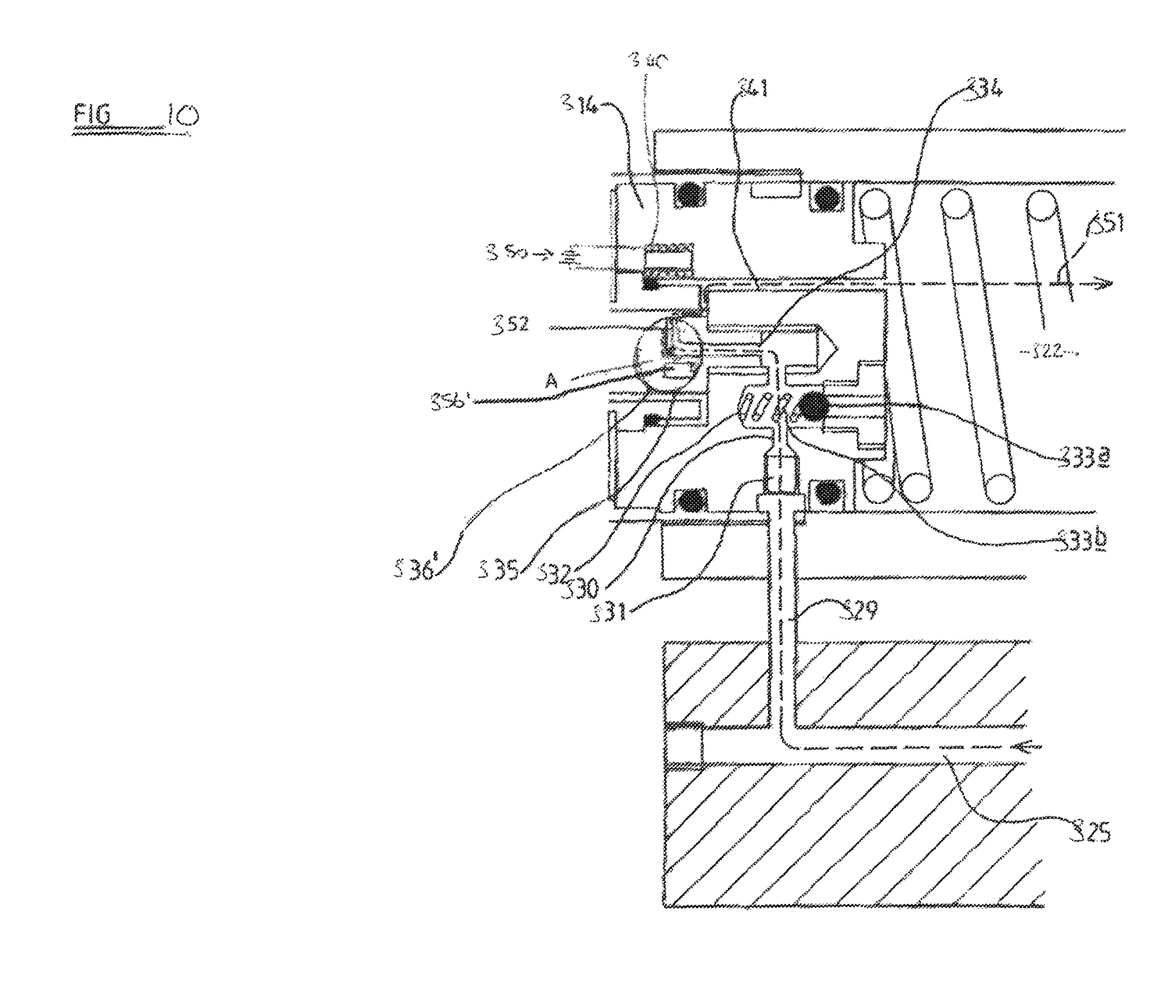
FIG. 10 shows the same area as FIG. 9, with the oil flow path for door closing indicated.
Figure 11:
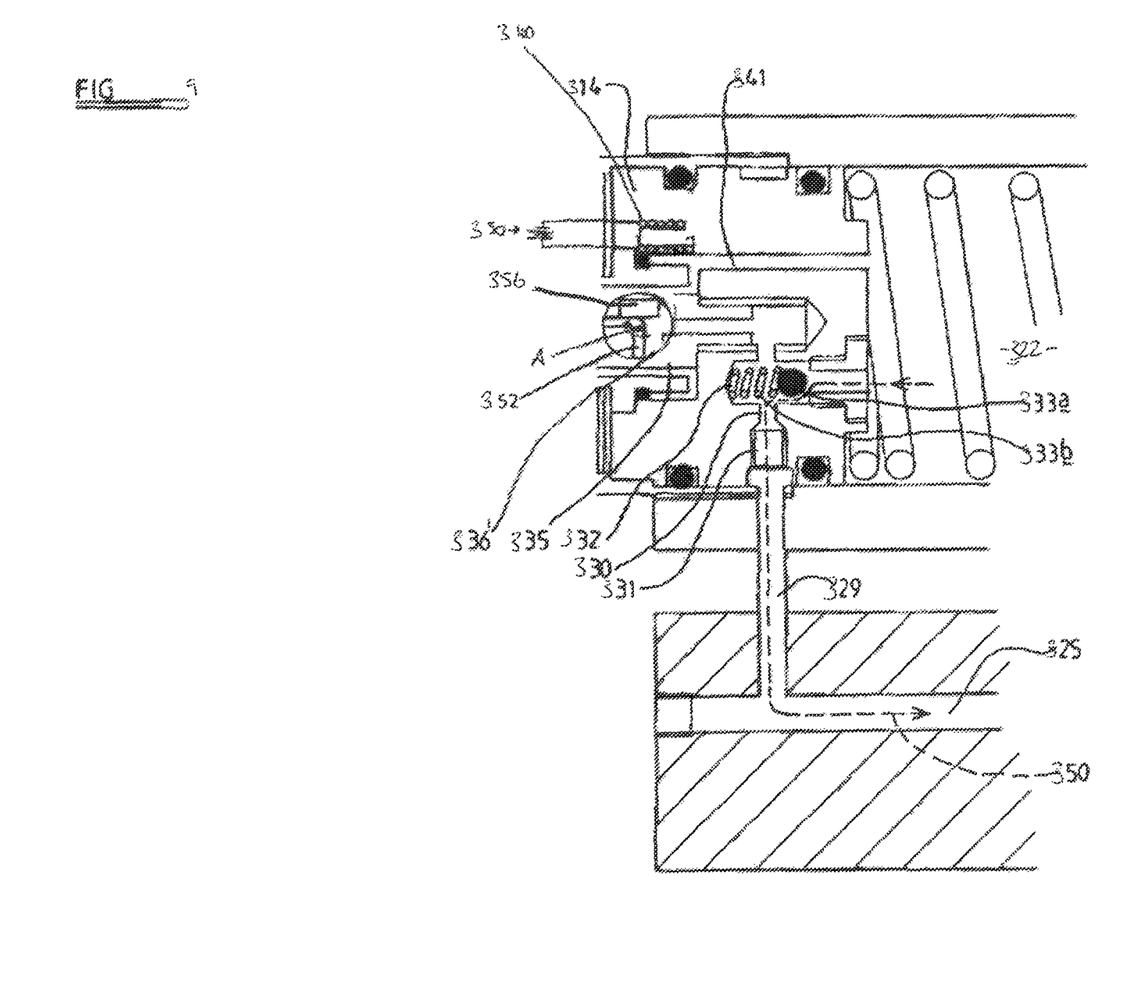

In a further alternative embodiment the plunger 38 and blocking member 36 have been replaced by an alternative blocking member 336, shown in FIGS. 9 and 10. Features in common with the embodiment shown in FIGS. 1 to 4 have been given the same reference numeral but with the addition of 300. In this embodiment the magnet 356 is connected to the blocking member 336 such that movement of the magnet 356 effects a rotational movement of the blocking member 336 about an axis A.

It can be seen that when the magnet 356 is in a first position, shown in FIG. 9, the blocking member 336 is in a blocking position, due to the fluid connection 352 in the blocking member 336 being misaligned with the bores 334, 341. When the magnet 356 is in a second position, shown in FIG. 10, the blocking member 336 is in a non-blocking position such that the fluid connection 352 is in alignment with the bores 334, 341, resulting in fluid being permitted to travel therethrough, as indicated by arrow 351.

Movement of the blocking member 336 is effected by movement of the magnet 356. This is effected by providing an electrical pulse to the pole switching device 340 to either attract the magnet 356 or repel the magnet 356. Attracting the magnet 356 causes the blocking member 336 to rotate about axis A into a first blocking position. The repulsion of the magnet 356 away from the pole switching device 340 causes the blocking member 336 to rotate about axis A to assume a non-blocking position. It should be appreciated that the magnet 356 could be positioned on the opposite side of the blocking member 336 without departing from the scope of the present invention. This would mean that when the pole switching device 340 attracts the magnet 356 it would cause the blocking member 336 to rotate into and assume a second non-blocking position, and when the pole switching device 340 repels the magnet 356 it would cause the blocking member 336 to assume a first blocking position. The mechanism by which movement of the door is effected is similar to the first embodiment.

The presence of bores 27 and 28 permits a flow of oil from the second cavity 22 to the piston cavity 18 via bore 27 or 28, the main passageway 25 and the bore 26 during the initial stages of the opening of the door. Similarly, they permit flow of fluid from the piston cavity 18 to the second cavity 22 via the bore 26, the main passageway 25 and bore 27 and 28 if open, during the final stages of the closing the door. These bores prevent the use of the magnetic valve to control the door closed, or within in this case 70° of closed.

A modified version of the door closer shown in FIGS. 1 to 4 may be provided with a further permanent magnet positioned to the left of the pole switching device 40 (i.e. farther away from the piston than the magnet 56). This further magnet therefore "sandwiches" the pole switching device 40 between the magnet 56 and itself. Once the moveable member 39 is moved towards its second position away from the magnet 56 the moveable member may be influenced by the further permanent magnet. This may be by the further permanent magnet holding the moveable member 39 in its second position by attracting the moveable member 39 towards it. When the moveable member 39 needs to be moved back to its first position, the pole switching device 40 produces a magnetic field which overcomes the field produced by the further magnet, thus attracting the moveable member 39 and moving it to its first position, where it is held in place by the magnet 56.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A door closer including:
   a body defining a chamber therein;
   a piston slidably supported within the chamber, and dividing the chamber into first and second cavities either side of the piston, which in use receive liquid;
   a biasing device for biasing the piston towards the first cavity;
   a passageway connecting the first cavity to the second cavity for permitting the flow of fluid therebetween;
   a blocking member for controlling the flow of liquid through the passageway between the cavities;
   a moveable member moveable between first and second positions, wherein when the moveable member is in its first position the moveable member causes or permits the blocking member to assume a blocking position, thus preventing or at least inhibiting the flow of liquid from the first to the second cavity, and wherein when the moveable member is in its second position the moveable member causes or permits the blocking member to assume a non-blocking position, thus permitting the flow of liquid from the first to the second cavity; and
   a permanent magnet positioned adjacent or close to the moveable member for holding the moveable member in its first position;
   wherein the door closer includes a pole switching device that can produce a magnetic field that is in opposition to the magnetic field of the permanent magnet to effectively cancel out or overcome the magnetic field of the permanent magnet and produce a net magnetic field that is either zero or in the opposite direction to the magnetic field of the permanent magnet so as to effect movement of the moveable member between its first and second positions.

2. A door closer according to claim 1 wherein the pole switching device is capable of producing a magnetic field to effect movement of the moveable member away from the permanent magnet.

3. A door closer according to claim 1 wherein the moveable member is connected directly or indirectly to the blocking member such that the moveable member and the blocking member move together.

4. A door closer according to claim 1 wherein the moveable member engages the blocking member to effect movement of the latter.

5. A door closer according to claim 1 wherein the movement of the moveable member between its first and second positions is substantially linear.

6. A door closer according to claim 1 wherein the magnet or the moveable member is positioned wholly or partially within the passageway connecting the first cavity to the second cavity.

7. A door closer according to claim 1 wherein the power source is a battery power source supported on, in or by the body, wherein the battery power source is contained within the body, wherein the battery power source is a 4.5V battery power source.

8. A door closer according to claim 1 wherein the permanent magnet surrounds, wholly or partially, the moveable member, wherein the permanent magnet is annular or part-annular.

9. A door closer according to claim 1 wherein the permanent magnet includes an aperture or passage through which the moveable member can pass.

10. A door closer according to claim 1 wherein the pole switching device includes an aperture or passage through which the moveable member can pass.

11. A door closer according to claim 10 wherein in its second position the moveable member is positioned substantially or completely within the aperture or passage in the pole switching device.

12. A door closer according to claim 9 wherein the aperture or passage in the pole switching device and the aperture or passage in the permanent magnet communicate with each other and are preferably coaxial.

13. A door closer according to claim 1 wherein the moveable member is a magnetically susceptible member.

14. A door closer according to claim 1 wherein the pole switching device is or includes an electromagnetic device, e.g. a solenoid.

15. A door closer according to claim 1 including a further passage connecting the first and second cavities which includes a one way valve which permits the flow of liquid therethrough only in a direction from the second cavity to the first cavity.

16. A door closer according to claim 1 wherein the pole switching device is positioned further away from the piston than the permanent magnet.

17. A door closer according to claim 1 wherein in its second position the moveable member is positioned at distance from the permanent magnet such that the magnetic field of the permanent magnet is unable it influence its movement.

18. A door closer according to claim 1 including a further permanent magnet for holding the moveable member in its second position, wherein the pole switching device is capable of producing a magnetic field that is in opposition to the magnetic field of the further permanent magnet to effectively cancel out or overcome the magnetic field of the further permanent magnet and produce a net magnetic field that is either zero or in the opposite direction to the magnetic field of the further permanent magnet so as to effect movement of the moveable member away from the further permanent magnet, and wherein in its first position the moveable member is positioned at distance from the further permanent magnet such that the magnetic field of the further permanent magnet is unable to influence its movement.

19. A door closer according to claim 1 wherein the blocking member is spherical or substantially spherical, conical or substantially conical.

20. A door closer according to claim 1 including a biasing member positioned within the second cavity for biasing the piston towards the first cavity.

* * * * *